United States Patent [19]

Shiozaki et al.

[11] 4,423,508

[45] Dec. 27, 1983

[54] LOGIC TRACING APPARATUS

[75] Inventors: Keniti Shiozaki; Hazuo Hibi, both of Hadano, Japan

[73] Assignee: Hitachi, Ltd., Tokyo, Japan

[21] Appl. No.: 303,525

[22] Filed: Sep. 18, 1981

[30] Foreign Application Priority Data

Sep. 19, 1980 [JP] Japan .................................. 55-129346

[51] Int. Cl.$^3$ ............................................. G06F 11/10
[52] U.S. Cl. ........................................ 371/16; 371/19; 371/29; 364/200
[58] Field of Search .............................. 371/16, 19, 29; 364/200

[56] References Cited

U.S. PATENT DOCUMENTS

| | | | |
|---|---|---|---|
| 3,771,131 | 11/1973 | Ling | 364/200 |
| 3,831,148 | 8/1974 | Greenwald et al. | 364/200 |
| 3,873,819 | 3/1975 | Greenwald | 371/16 |
| 3,937,938 | 2/1976 | Matthews | 371/19 |
| 4,253,183 | 2/1981 | Taylor et al. | 371/16 |

Primary Examiner—Charles E. Atkinson

Attorney, Agent, or Firm—Antonelli, Terry & Wands

[57] ABSTRACT

During the diagnosis of a data processor, when errors are detected, a logic tracing apparatus permits a hardware history concerning these errors to be obtained. The data processor produces a stop signal when or before a result comparison routine of a test program is started to be executed, a start signal when no errors are detected by the execution of the result comparison routine, and a hold signal when errors are detected. When supplied with this stop signal, the logic tracing apparatus stops the memory from writing the hardware information. Subsequently, when supplied with the hold signal, the logic tracing apparatus holds the state in which the memory stops writing operation until it is reset by the data processor. In addition, under the condition in which the stopped state is released, when the start signal is supplied to the apparatus, the write operation of memory is restarted thereby. Therefore, when a plurality of test programs are run in the data processor for the purpose of diagnosis, the logic tracing apparatus assures that the history information is held in the memory.

3 Claims, 4 Drawing Figures

LOGIC TRACING APPARATUS

BACKGROUND OF THE INVENTION

This invention relates to a logic tracing apparatus and particularly to a logic tracing apparatus for obtaining a history of the hardware status concerning an error when the error is detected during the diagnosis of a data processor.

When the data processor (including any type of logic devices based on program control) is diagnosed, a test program is generally run. In order to analyze the error detected by the diagnosis, it is necessary to take out the history of the hardware status just before the error detection. To do this, a logic tracing apparatus is connected to the data processor so that hardware status information to be inspected is written sequentially at constant time intervals in a memory within the logic tracing apparatus.

In the prior art, the writing of the hardware status information is stopped by a stop signal generated when an error is detected in the data processor. However, when an error occurs during the running of a test program, a certain time elapses until the error is detected by a result comparison routine of the test program. Thus, unless the memory within the logic tracing apparatus has a considerably large capacity, the desired pieces of recorded information may be lost.

In the conventional method, the write operation is necessarily restarted by a start signal which is always generated when no error is detected by the result comparison routine of the test program. In this case, when only one test program is used, there is particularly no problem. However, where two or more test programs are used for diagnosis, the stop signal generated when an error is detected by the result comparison routine of one of the test programs stops the writing operation of the logic tracing apparatus, but the write operation is restarted by the start signal which may be generated by the run of another test program, thereby erasing the recorded history.

SUMMARY OF THE INVENTION

It is an object of the invention to provide an improved logic tracing apparatus having a memory which has as small a capacity as possible and in which such loss of the desired pieces of history information is prevented even when a plurality of test programs are used.

The object is achieved by a logic tracing apparatus which is connected to the data processor and adapted to have a memory capable of continuously writing the hardware status information of the data processor at constant time intervals, and in which when a test program is run for diagnosis on the data processor, a stop signal is outputted from the data processor on or before the start of execution of the result comparison routine of the test program, and when an error is detected by the execution of the result comparison routine, a hold signal is produced from the data processor, but when no error is detected, a start signal is generated therefrom. When supplied with the stop signal, the logic tracing apparatus stops writing the hardward status information into the memory. Subsequently, when supplied with the hold signal, the logic tracing apparatus holds the stop condition in which the memory stops writing until the data processor resets the holding of the stop condition. If the stop condition is cancelled, the writing of the hardware status information into the memory is restarted by the start signal. Consequently, the history of the hardware status information associated with the erroneous operation of the data processor is stored in the memory of the logic tracing apparatus.

In accordance with the invention, the writing into the memory is stopped before an error is detected by the result comparison routine of any test program. Thus, it is sufficient for the apparatus of the present invention to be provided with a small capacity memory for maintaining desired pieces of hardware history information in the memory to be inspected upon detection of an error. Moreover, when an error is detected, a hold signal is generated to hold the memory at the stop condition of writing so that even when a plurality of test programs are used in parallel, the write operation of the memory is never restarted by execution of another test program, so that the desired pieces of hardware history information can be surely maintained.

DESCRIPTION OF THE PREFERRED EMBODIMENT

Figure 1:
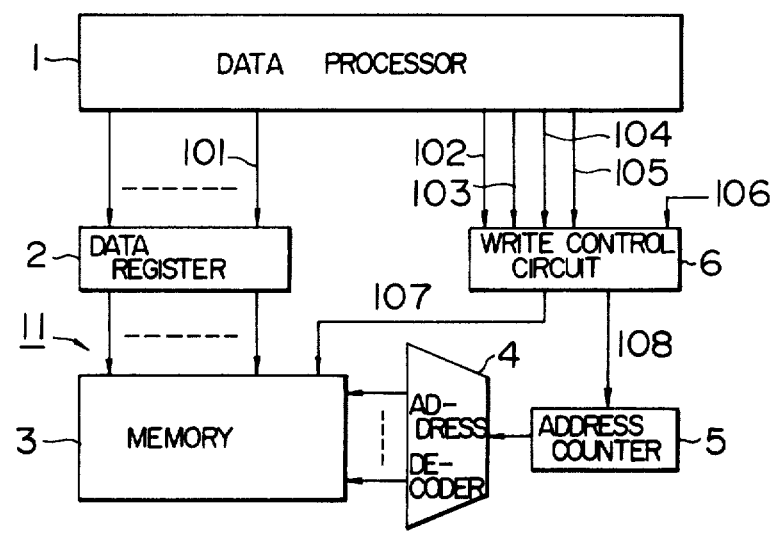
FIG. 1 shows a schematic block diagram of the logic tracing apparatus of the invention and the information processor connected thereto.

FIG. 1 is a block diagram of an data processor 1 and a logic tracing apparatus 11 connected thereto.

The data processor 1 is, for example, a well-known central processor, which performs various arithmetic processes under a program control, and includes therein logic circuits which are subjected to diagnosis by running a test program.

The logic tracing apparatus 11 includes a data register 2, in which hardware status information regarding the data processor 1 is set through a signal group 101. This hardware status information includes, for example, operation codes of instructions, instruction addresses, CS (control storage) addresses and so on. This hardware status information is useful for tracing the history in operation of hardware when an erroneous operation is detected in the data processor. The hardware status information set in the data register 2 is written in a memory 3 in sequence.

When the hardware status information is written at locations in the memory 3, the addresses of the locations are specified by an address decoder 4. In other words, a write control circuit 6 produces an address renewing signal 108, by which the contents of an address counter 5 are renewed in sequence. The address decoder 4 decodes the output of the address counter 5 and supplies a write address to the memory 3 to designate one of the locations.

The write control circuit 6 fundamentally serves to control the hardware status information to be written in the memory 3. This write control circuit 6 is supplied with a write pulse signal 106 having a constant period from a known timer (not shown), and also with a stop signal 102, a start signal 103, a hold signal 104 and a reset signal 105 from the data processor. Then, the write control circuit 6 supplies a write pulse signal 107 to the memory 3 and an address renew (count-up) pulse signal 108 to the address counter 5. At this time, the stop signal 102, start signal 103, hold signal 104 and reset signal 105 are outputted from the data processor 1 under a diagnose command on the basis of a decoded instruction when the processor 1 is executing a test program.

Figure 2:
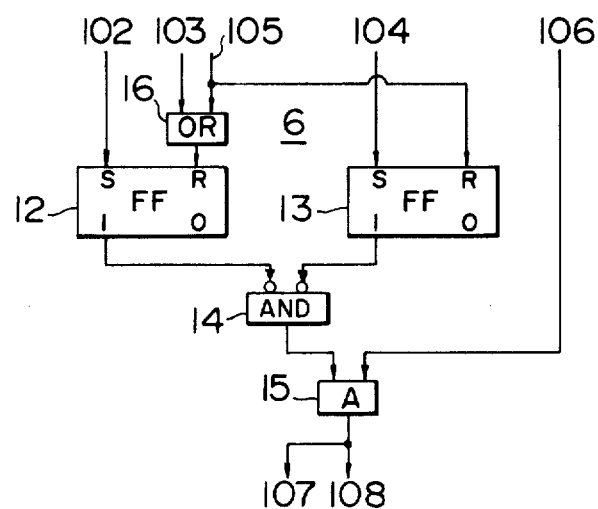
FIG. 2 is a circuit diagram of the write control circuit in FIG. 1.

This write control circuit 6 performs a write control characteristic for this embodiment, as shown in detail in FIG. 2.

The stop signal 102 is applied to the set terminal S of a flip-flop 12. The start signal 103 is applied to an OR gate 16, the output of which is applied to the reset terminal R of the flip-flop 12. To the OR gate 16 is also applied the reset signal 105, which is also applied to the reset terminal R of a flip-flop 13. The hold signal 104 is applied to the set terminal S of the flip-flop 13.

The flip-flop 12 is set by the stop signal 102 and reset by the start signal 103 and the reset signal 105 (both applied through the OR gate 16). The other flip-flop 13 is set by the hold signal 104 and reset by the reset signal 105.

The outputs "1" of the flip-flops 12 and 13 are fed to an AND gate 14 with inverting inputs, the output of which is applied to an AND gate 15. The write pulse 106 is fed through the AND gate 15 to the memory 3 and address counter 5, as signals 107 and 108, respectively. This AND gate 15 is controlled according the condition of the flip-flops 12 and 13. More particularly, when both the flip-flops 12 and 13 are in the reset condition, the output of the AND gate 14 opens the gate 15 thereby permitting the hardware status information to be written in the memory 3 and at the same time renewing the content of the address counter 5.

Figure 3:
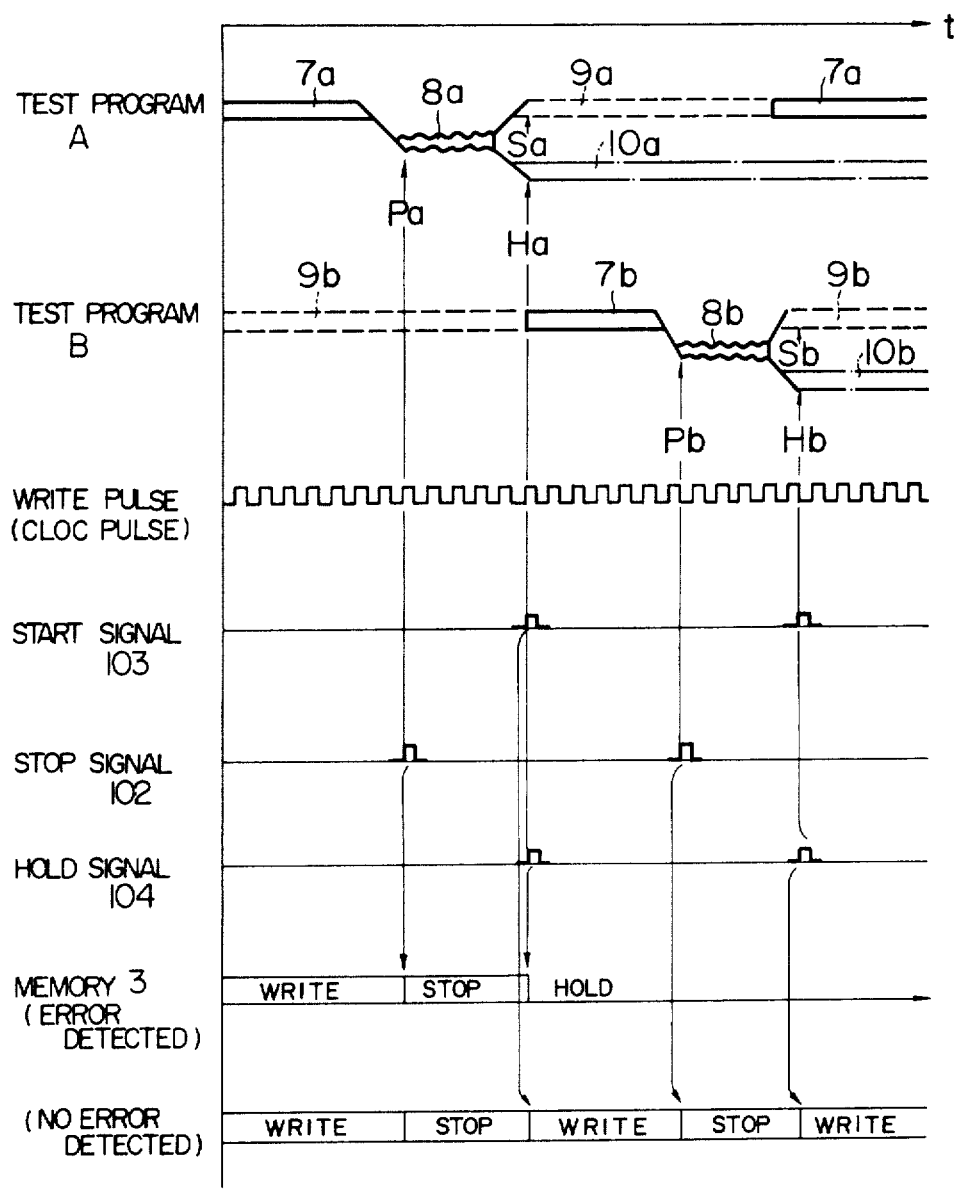
FIG. 3 is a timing chart of each signal and memory operation under the condition that two test programs are run.
Figure 4:
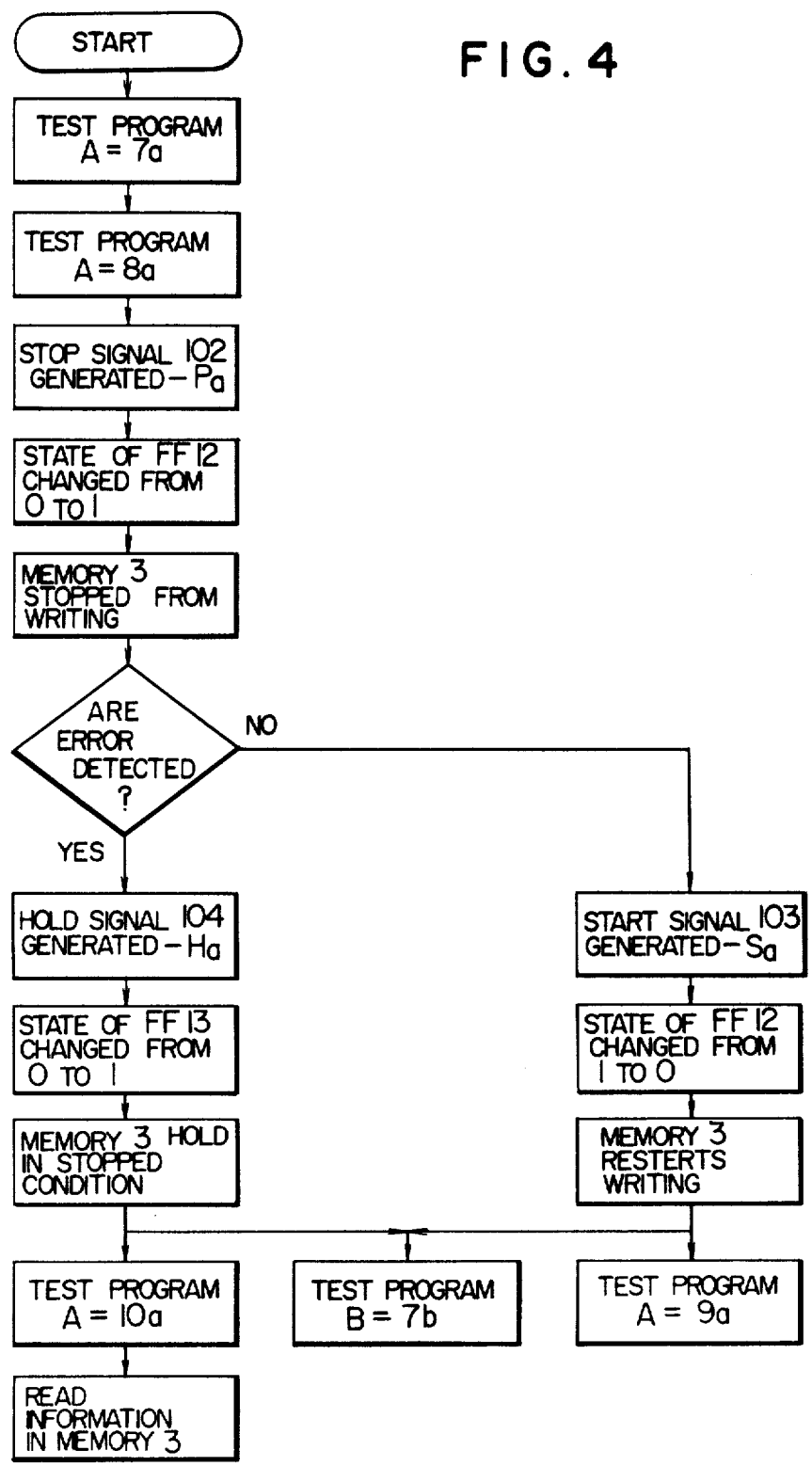
FIG. 4 is a flow chart of test program to which reference is made in explaining the operation of the apparatus of the invention.

The operation of the apparatus will hereinafter be described with reference to the timing chart of FIG. 3 and the flow chart of FIG. 4. In the data processor 1, two test programs A and B are simultaneously run in parallel. The test program A is for diagnosing, for example, one adding process and the test program B is for another adding process including steps different from those of the program A.

In a period 7a in which a certain process routine of the test program A is executed, a process which is relating to the adding function to be diagnosed and whose result is preliminarily known is performed. After the completion of this process, the result of the process is compared with the preliminarily known result for deciding whether an error is present or not, i.e., the result comparison routine is executed (period 8a). At the beginning Pa of the result comparison routine, the information processor 1 produces the stop signal 102 in response to a stop-signal producing command provided at the head of this result comparison routine which command is decoded within the hardware. This stop signal 102 sets the flip-flop 12 in FIG. 2, thereby closing the AND gate 15 to stop the write operation of the memory 3.

If no error is detected by the result comparison routine, an instruction is issued at a time point Sa, to generate the start signal 103 from the information processor 1. This signal 103 resets the flip-flop 102 to open the AND gate 15, causing the memory 3 immediately to restart the write operation. At the same time, the test program A enters the waiting condition (period 9a) in which the next process routine is suspended, while the other test program B is executed.

After the process routine of the test program B (period 7b) has been executed, the execution of the result comparison routine (period 8b) starts. At a time point Pb, an instruction is issued to generate the stop signal 102, thereby stopping the write operation of the memory 3. If an error is detected by the result comparison routine, an instruction is issued at a time point Hb to generate the hold signal 104. This signal 104 sets the flip-flop 13 to cause the memory 3 to stop the write operation, while the test program B enters the waiting condition (period 10b) until the history information within the memory 3 is taken out.

If no error is detected by the result comparison routine, the start signal 103 is produced at a time point Sb, resetting the flip-flop 12. Consequently, the memory 3 restarts the write operation immediately, and the test program B enters the waiting condition (period 9b) while the test program A is executed. These operations occur when no error is detected in the decision routine (period 8a) of the test program A. If an error is detected and the hold signal 104 is produced at the time point Ha, the flip-flop 13 is set. Thus, even though the flip-flop 12 is reset by the start signal 102 produced at the time point Sb, the AND gate 15 maintains its closing condition and accordingly the write operation of the memory 3 still stops. The condition in which the memory stops writing is continued until the history information for the test program A has been taken out of the memory 3 and the reset signal 105 is produced from the information processor 1 to reset the flip-flop 13. When the flip-flop 12 or 13 is reset, the write operation of the memory 3 is inhibited, and the hardware status information within the memory 3 is read and supplied to, for example, a floppy disk.

While in this embodiment the stop signal 102 is supplied at the head of the result comparison routine of each test program, the stop signal 102 may be supplied slightly after the execution of the result comparison routine has started. In a specific case such as occurrence of an interrupt during the execution of the process routine, the stop signal may be produced upon occurrence of the interrupt.

In this way, in this embodiment, the write operation of the memory is stopped before erroneous operation is detected by the decision routine of the test program. Even when a plurality of test programs are run in parallel, the write operation of the memory, which has been stopped by execution of one test program is never restarted by execution of another test program, and the desired pieces of the hardware status information recorded in the memory can be surely taken out.

We claim:

1. A logic tracing apparatus having a memory for successively storing hardware status information relating to operation of a data processor during execution of a test program by the data processor, said data processor including means for generating a stop signal on or before the start of a comparison routine in the test program for comparing a result of esecution of the test program with a predetermined result, a hold signal when an erroneous operation is detected by the execution of the result comparison routine and a start signal when said data processor restarts the operation thereof after the execution of the result comparison routine, said logic tracing apparatus comprising:

(a) data register means connected between said data processor and said memory for temporarily storing the hardware status information successively outputted from the data processor prior to the storing of said information in said memory;

(b) addressing means connected to said memory for applying an address to said memory at which the information within said data register means is to be stored in said memory; and (c) control means connected to said data processor, said addressing means and said memory for generating a write enable signal to effect the storing of data from said data register means into said memory at the address specified by said addressing means, and including means for preventing the storing operation of the hardware status information from the data register into said memory in response to either one of said stop signal or said hold signal or both, said control means including means for allowing the storing operation of said information into said memory in response to said start signal when no hold signal is received, while preventing the storing operation of said information even in response to said start signal when said hold signal has been received.

2. A logic tracing apparatus according to claim 1, wherein said control means comprises:

(a) first signal holding means set by the stop signal and reset by at least the start signal;

(b) second signal holding means set by the hold signal and reset by a reset signal; and (c) logic circuit means connected to receive output signals from the first and second signal holding means for producing a write pulse to the memory and an address renewing signal to the addressing means when both said first and second signal holding means are reset, while preventing the storing operation of said status information when at least one of said holding means is set.

3. A logic tracing apparatus according to claim 1, wherein said control means includes a first flip-flop having a set input connected to receive said stop signal and a reset input connected to receive said start signal, a second flip-flop having a set input connected to receive said hold signal and a reset input connected to receive a reset signal from said processor, an AND gate having a pair of inverting inputs connected to the set outputs of said first and second flip-flops, respectively, and gating means responsive to the output of said AND gate for selectively providing said write enable signal.

* * * * *